(12) United States Patent
Nyholm et al.

(10) Patent No.: US 10,905,211 B2
(45) Date of Patent: Feb. 2, 2021

(54) CASE FOR A TABLET SHAPED COMPUTER

(71) Applicant: STM MANAGEMENT PTY LTD, Alexandria (AU)

(72) Inventors: Ethan Nyholm, North Bondi (AU); Cambell Smyth, Highgate Hill (AU)

(73) Assignee: STM MANAGEMENT PTY LTD., Alexandria (AU)

( * ) Notice: Subject to any disclaimer, the term of this patent is extended or adjusted under 35 U.S.C. 154(b) by 0 days.

(21) Appl. No.: 16/663,127

(22) Filed: Oct. 24, 2019

(65) Prior Publication Data
US 2020/0187612 A1 Jun. 18, 2020

(51) Int. Cl.
*H04B 1/3888* (2015.01)
*H05K 5/00* (2006.01)
*G06F 3/0354* (2013.01)
*A45C 11/00* (2006.01)
*A45C 13/02* (2006.01)
*G06F 3/039* (2013.01)

(52) U.S. Cl.
CPC .............. *A45C 11/00* (2013.01); *A45C 13/02* (2013.01); *G06F 3/039* (2013.01); *A45C 2011/003* (2013.01); *A45C 2013/025* (2013.01); *A45C 2200/15* (2013.01)

(58) Field of Classification Search
None
See application file for complete search history.

(56) References Cited

U.S. PATENT DOCUMENTS

| 59,618 | A | 11/1866 | Mahon |
| 2,528,695 | A | 11/1950 | King |
| 4,815,880 | A | 3/1989 | Sekiguchi |
| D366,146 | S | 1/1996 | Bertrand |
| 5,498,089 | A | 3/1996 | Motyka |
| D385,299 | S | 10/1997 | Adams |
| 5,769,213 | A | 6/1998 | Chatterton |
| D410,951 | S | 6/1999 | Schwarzwaelder |
| 6,016,248 | A | 1/2000 | Anzai et al. |
| 6,301,101 | B1 | 10/2001 | Anzai et al. |
| 6,726,070 | B2 | 4/2004 | Lautner |
| D508,954 | S | 8/2005 | Cetera |
| 6,926,151 | B1 | 8/2005 | Starr et al. |
| D522,583 | S | 6/2006 | Goserud |
| 7,318,521 | B2 | 1/2008 | Lau |

(Continued)

FOREIGN PATENT DOCUMENTS

| AU | 349263 | 6/2013 |
| AU | 2016100745 A4 | 6/2016 |
| AU | 2018101268 A4 | 10/2018 |

OTHER PUBLICATIONS

IPad Pro 2018 11/12.9 Case Pencil Holder Amazing Deal <URL: https://www.youtube.com/watch?v=J4gSwJ7XyQM>, Published on Nov. 23, 2018.

(Continued)

*Primary Examiner* — Tuan A Tran

(74) *Attorney, Agent, or Firm* — Christensen, Fonder, Dardi & Herbert PLLC

(57) ABSTRACT

A case for a tablet shaped device. The case comprising a body including a rear wall, a perimeter wall and a front face, the rear wall and the perimeter wall being cooperatively arranged to provide a stylus receiving space at the front face for receiving a stylus for the tablet shaped device.

6 Claims, 12 Drawing Sheets

(56) References Cited

U.S. PATENT DOCUMENTS

| | | |
|---|---|---|
| 7,843,395 B2 * | 11/2010 | Chen .................. G06F 1/1626 343/702 |
| D645,505 S | 9/2011 | Melnick |
| 8,132,670 B1 | 3/2012 | Chen |
| D658,187 S | 4/2012 | Dieel |
| D667,831 S | 9/2012 | Stravitz |
| 8,264,310 B2 | 9/2012 | Lauder et al. |
| 8,344,836 B2 | 1/2013 | Lauder et al. |
| D676,449 S | 2/2013 | Probst et al. |
| D678,260 S | 3/2013 | Bau |
| D679,715 S | 4/2013 | Akana et al. |
| 8,415,572 B2 * | 4/2013 | Yang .................. G06F 3/03545 178/19.01 |
| D681,641 S | 5/2013 | Van Den Nieuwenhuizen et al. |
| 8,474,609 B1 | 7/2013 | Hong et al. |
| D688,251 S | 8/2013 | Akana et al. |
| D690,703 S | 10/2013 | Welch et al. |
| 8,555,938 B2 | 10/2013 | Costello |
| D696,253 S | 12/2013 | Akana et al. |
| D696,256 S | 12/2013 | Piedra |
| D696,669 S | 12/2013 | Akana et al. |
| 8,607,976 B2 | 12/2013 | Wu et al. |
| D700,611 S | 3/2014 | Boldetti |
| 8,672,126 B2 | 3/2014 | Rohrbach et al. |
| D702,673 S | 4/2014 | Murchison et al. |
| D704,769 S | 5/2014 | Penington |
| 8,714,351 B2 | 5/2014 | Toulette |
| 8,724,300 B2 | 5/2014 | Smith et al. |
| 8,746,446 B2 | 6/2014 | Chiang |
| D708,621 S | 7/2014 | Gifford et al. |
| 8,807,333 B1 | 8/2014 | Cooper et al. |
| 8,817,457 B1 | 8/2014 | Colby et al. |
| 8,817,466 B2 * | 8/2014 | Xie .................. G06F 1/1626 178/19.01 |
| D713,848 S | 9/2014 | Akana et al. |
| 8,833,819 B2 | 9/2014 | Chen |
| 8,878,637 B2 | 11/2014 | Sartee et al. |
| D719,169 S | 12/2014 | McBroom |
| 8,905,231 B2 | 12/2014 | Couch, III |
| 8,928,437 B2 | 1/2015 | Lauder et al. |
| 8,944,715 B2 | 2/2015 | Yoder |
| 8,960,421 B1 | 2/2015 | Diebel |
| D723,568 S | 3/2015 | Kim |
| D724,090 S | 3/2015 | Kim |
| D727,916 S | 4/2015 | Melmon |
| D727,919 S | 4/2015 | Melmon |
| D729,253 S | 5/2015 | Nyholm |
| D733,152 S | 6/2015 | Sirichai |
| D733,714 S | 7/2015 | Ballou et al. |
| D734,340 S | 7/2015 | Kim |
| D736,777 S | 8/2015 | Rayner |
| 9,095,194 B2 | 8/2015 | Hassett |
| 9,149,100 B2 * | 10/2015 | Marshall .................. A45C 11/00 |
| D744,489 S | 12/2015 | Sirichai |
| D744,492 S | 12/2015 | Lin |
| D744,745 S | 12/2015 | Fischer |
| 9,215,303 B2 | 12/2015 | Nyholm et al. |
| 9,225,814 B2 | 12/2015 | Nyholm et al. |
| 9,226,567 B2 | 1/2016 | Potter et al. |
| D753,648 S | 4/2016 | Shyu |
| 9,307,062 B2 | 4/2016 | Kim |
| D755,504 S | 5/2016 | Thomson |
| D757,018 S | 5/2016 | Pearce |
| D757,731 S | 5/2016 | Nguyen et al. |
| 9,327,544 B2 * | 5/2016 | Ceruzzi .................. B43K 23/001 |
| 9,335,791 B2 * | 5/2016 | Fontana .................. G06F 1/1632 |
| 9,354,724 B2 * | 5/2016 | Huguenard .......... G06F 3/03545 |
| 9,395,753 B2 * | 7/2016 | Amano .................. G06F 1/1626 |
| D764,472 S | 8/2016 | Corcoran |
| D764,474 S | 8/2016 | Penn |
| D764,475 S | 8/2016 | Penn |
| D765,085 S | 8/2016 | Moore |
| 9,407,743 B1 | 8/2016 | Hirshberg |
| D772,880 S | 11/2016 | Corcoran |
| 9,489,054 B1 | 11/2016 | Sumsion |
| D773,470 S | 12/2016 | Akana |
| D775,132 S | 12/2016 | Smith et al. |
| D776,122 S | 1/2017 | Akana et al. |
| D776,123 S | 1/2017 | Akana et al. |
| D779,485 S | 2/2017 | Akana |
| 9,578,941 B2 | 2/2017 | MacLachlan |
| D786,256 S | 5/2017 | Stewart |
| D786,881 S | 5/2017 | Stewart et al. |
| D789,342 S | 6/2017 | Sirichai |
| D789,936 S | 6/2017 | Nyholm |
| D792,884 S | 7/2017 | Nyholm |
| D792,887 S | 7/2017 | Zhang |
| 9,717,314 B2 | 8/2017 | Idehara |
| 9,748,999 B2 | 8/2017 | Nyholm et al. |
| D804,486 S | 12/2017 | Nyholm et al. |
| D807,363 S | 1/2018 | Hallier |
| D807,365 S | 1/2018 | Liu |
| D807,892 S | 1/2018 | Wang |
| D808,394 S | 1/2018 | Lakraa |
| D808,395 S | 1/2018 | Fenton |
| D811,390 S | 2/2018 | Kim |
| D811,411 S | 2/2018 | Moore |
| D812,621 S | 3/2018 | Nyholm et al. |
| D819,038 S | 5/2018 | Diebel |
| D820,639 S | 6/2018 | Akana |
| D822,675 S | 7/2018 | Zhu |
| 10,110,269 B2 * | 10/2018 | Nyholm .................. A45C 11/00 |
| 2004/0240164 A1 | 12/2004 | Lee |
| 2006/0007645 A1 | 1/2006 | Chen et al. |
| 2007/0057140 A1 | 3/2007 | Liou |
| 2008/0029412 A1 | 2/2008 | Ho |
| 2008/0167095 A1 | 7/2008 | Kim |
| 2009/0159763 A1 | 6/2009 | Kim |
| 2009/0178938 A1 | 7/2009 | Palmer |
| 2009/0194209 A1 | 8/2009 | De Filippis |
| 2009/0201254 A1 | 8/2009 | Rais |
| 2010/0294909 A1 | 11/2010 | Hauser |
| 2010/0300909 A1 | 12/2010 | Hung |
| 2011/0227463 A1 | 9/2011 | Hou |
| 2011/0266194 A1 | 11/2011 | Bau |
| 2011/0267748 A1 | 11/2011 | Lane et al. |
| 2011/0285671 A1 * | 11/2011 | Wu .................. G06F 3/0487 345/179 |
| 2011/0290687 A1 | 12/2011 | Han |
| 2011/0297566 A1 | 12/2011 | Gallagher |
| 2011/0309117 A1 | 12/2011 | Roberts |
| 2012/0088557 A1 | 4/2012 | Liang |
| 2012/0140396 A1 | 6/2012 | Zeliff |
| 2012/0268891 A1 | 10/2012 | Cencioni |
| 2013/0020216 A1 | 1/2013 | Chiou |
| 2013/0048514 A1 | 2/2013 | Corcoran et al. |
| 2013/0048520 A1 | 2/2013 | Garrett et al. |
| 2013/0140194 A1 | 6/2013 | Han |
| 2013/0233762 A1 | 9/2013 | Balaji et al. |
| 2013/0264459 A1 | 10/2013 | McCosh |
| 2014/0077669 A1 * | 3/2014 | Choi .................. H05K 5/0004 312/223.1 |
| 2014/0291175 A1 | 10/2014 | Chung |
| 2015/0001105 A1 | 1/2015 | Nyholm et al. |
| 2015/0263776 A1 | 9/2015 | Shyu et al. |
| 2015/0296060 A1 | 10/2015 | Gu |
| 2015/0296068 A1 | 10/2015 | Chin |
| 2016/0011628 A1 | 1/2016 | Sato |
| 2016/0187937 A1 | 6/2016 | Ahee |

OTHER PUBLICATIONS

Examination Report No. 1 from corresponding Australian Patent Application 2019100104 dated Aug. 19, 2020 (9 pages).

* cited by examiner

CASE FOR A TABLET SHAPED COMPUTER

RELATED APPLICATIONS

The present application claims priority to Australian Provisional Patent Application No. 2018904774 filed Dec. 14, 2018, and also claims priority to Australian Innovation Patent Application No. 2019100104, filed Jan. 31, 2019, which are incorporated herein by reference.

TECHNICAL FIELD

The disclosure herein generally relates to a case for a tablet shaped device.

BACKGROUND

Cases for tablet shaped devices, examples of which include but are not limited to the APPLE IPAD™, SAMSUNG GALAXY TAB™, smartphones like the APPLE IPHONE™, and some personal digital assistants, are commercially available. Some electronic tablet shaped devices have a touch screen and come with a stylus for drawing or writing on the touchscreen. Examples of styli include but are not limited to the APPLE PENCIL™, (for example models that are configured to start charging when magnetically attached to the APPLE IPAD PRO™, including but not necessarily limited to the second generation APPLE PENCIL™, and other example models including the FIFTYTHREE PENCIL™, THE WACOM INTUOS CREATIVE STYLUS 2™ and styli manufactured BY ADONIT™ and other manufactures.

The commercially available cases for tablet shaped devices may not meet some of the needs of consumers, and may be more difficult and/or costly to manufacture than is desirable.

SUMMARY

The present invention provides a case for a tablet shaped device, the case comprising: a body comprising a rear wall, a perimeter wall and a front face, the rear wall and the perimeter wall being cooperatively arranged to provide a stylus receiving space at the front face for receiving a stylus for the tablet shaped device and a tablet shaped device receiving space at the front face for receiving the tablet shaped device, the tablet shaped device receiving space being contiguous with the stylus receiving space.

In the context of the present document, the term stylus encompasses a hand-held tool used by a user to interact with a touch sensitive area (for example a touch sensitive screen) of the tablet shaped device. A stylus may, but not necessarily, comprise an elongated shaft having opposite ends and a touch sensitive area interaction point at at least one of the opposite ends.

In an embodiment, the perimeter wall defines a passageway between the stylus receiving space and a case exterior. The passageway may be configured to receive an end of the stylus when the stylus is so received by the stylus receiving space. The passageway may comprise a slot.

An embodiment comprises a tablet shaped device control button adjacent the passageway. The control button may be externally operable.

In an embodiment, the stylus receiving space is elongated and intermediate an outer edge of the tablet shaped device receiving space and the perimeter wall.

In an embodiment, the perimeter wall comprises at least one inwardly projecting resilient lip for holding the tablet shaped device within the tablet shaped device receiving space.

In an embodiment, a portion of the perimeter wall extending along an outer-side of the stylus receiving space does not comprise a stylus retaining feature projecting into the stylus receiving space. The perimeter wall may not comprise a stylus retaining feature projecting into the stylus receiving space.

Embodiments may not comprise a stylus retaining feature.

In an embodiment, the stylus receiving space is deeper than the tablet shaped device receiving space. The stylus receiving space may be deeper than the tablet shaped device receiving space by at least half the difference between the tablet shaped device thickness and a transverse stylus dimension.

In an embodiment, a discontinuity in the perimeter wall provides finger access to the stylus when so received.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
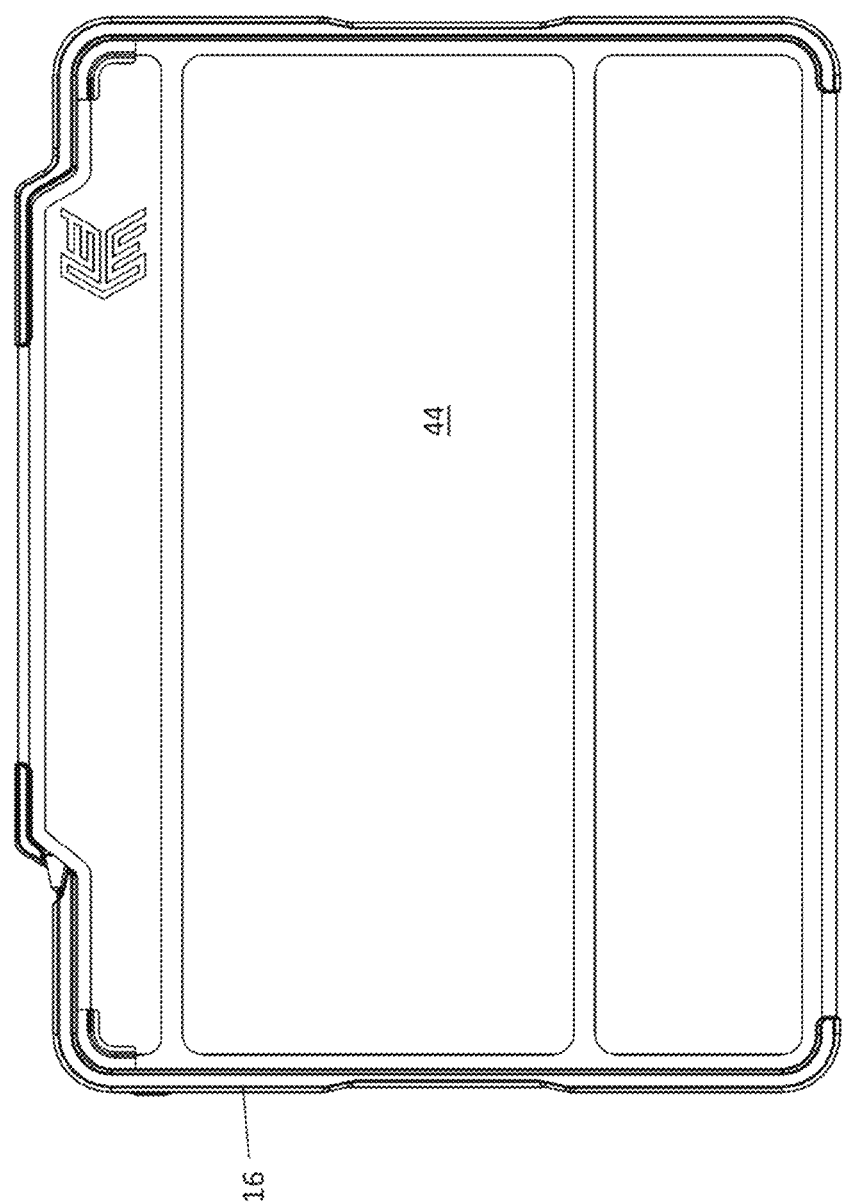
FIG. 1 shows a plan view of the front of a case for a tablet shaped device, the case having a tablet shaped device protective flap in a closed configuration.
Figure 2:
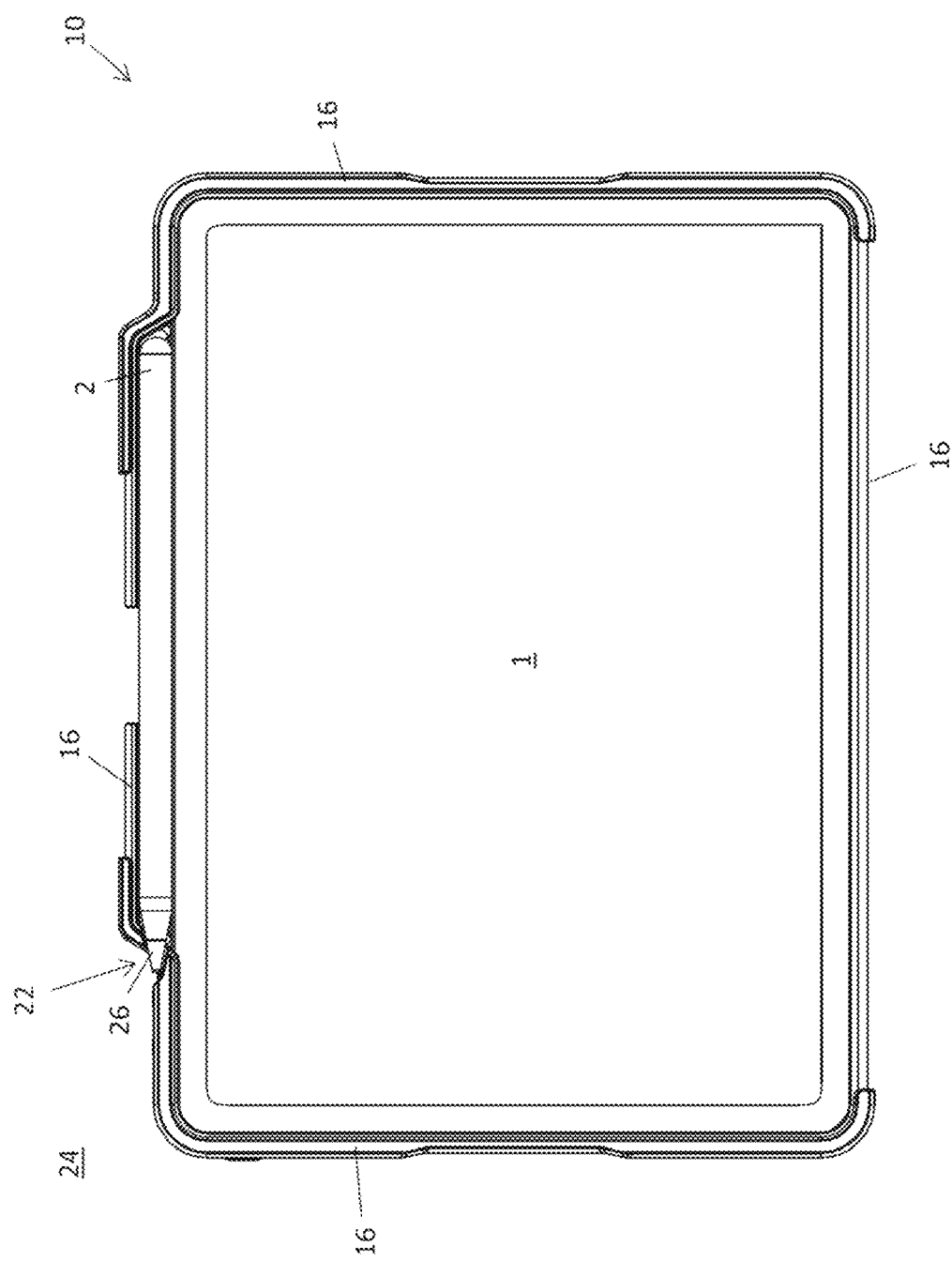
FIG. 2 shows a plan view of the front of the case of FIG. 1, with the tablet shaped device protective flap hidden for illustrative purposes to reveal the tablet shaped device and a stylus for the tablet shaped device received by the case.
Figure 3:
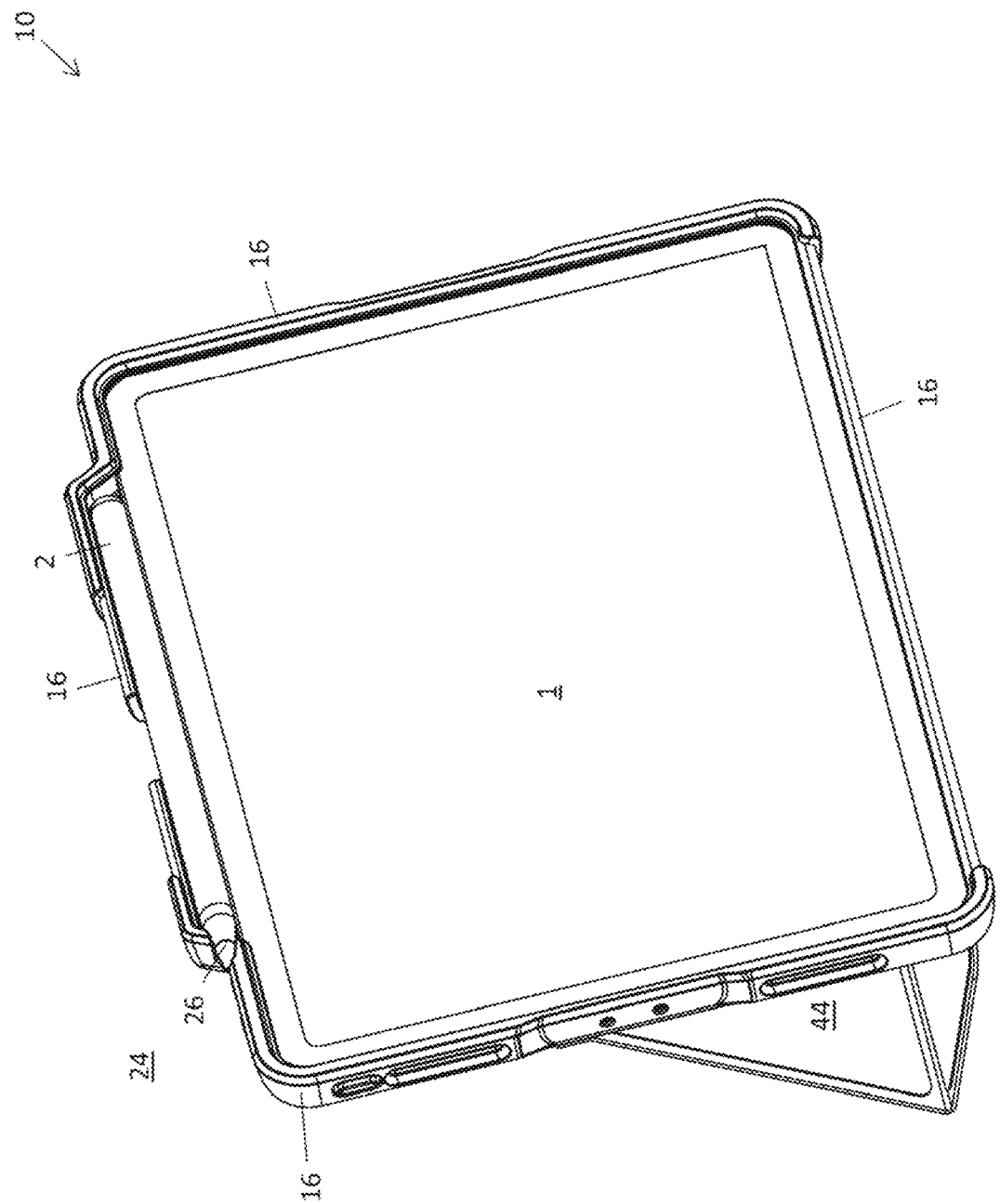
FIG. 3 shows a perspective view of the front of the case of FIG. 1, with the protective flap in a stand configuration, in which the flap is folded at the rear of the case.

Shown in the FIGS. 1 to 10 are various views of an embodiment of a case for a tablet shaped device, the case being generally indicated by the numeral 10 and the tablet shaped device by numeral 1. The case 10 comprises a body 12 comprising a rear wall 14, a perimeter wall 16 and a front face 18. The rear wall 14 and the perimeter wall 16 are cooperatively arranged to provide a stylus receiving space 20 at the front face 18 for receiving a stylus 2 for the tablet shaped device 1. The rear wall 14 and the perimeter wall 16 are cooperatively arranged to define a tablet shaped device receiving space 21 at the front face 18 for receiving the tablet shaped device 1. The tablet shaped device receiving space 21 is contiguous with the stylus receiving space 20.

The tablet shaped device receiving space 21 and stylus receiving space 20 open into each other ("connected spaces") at a shared common border. The perimeter wall 16 and the rear wall 14 protect at least one of the tablet shaped device 1 and stylus 2 when so received, as shown in FIGS. 2-6, 8-9. The perimeter wall 16 and the rear wall 18 define a plurality of optional ports (e.g. port 15) for cable or other access to the tablet shaped device 1 when received.

Figure 10:
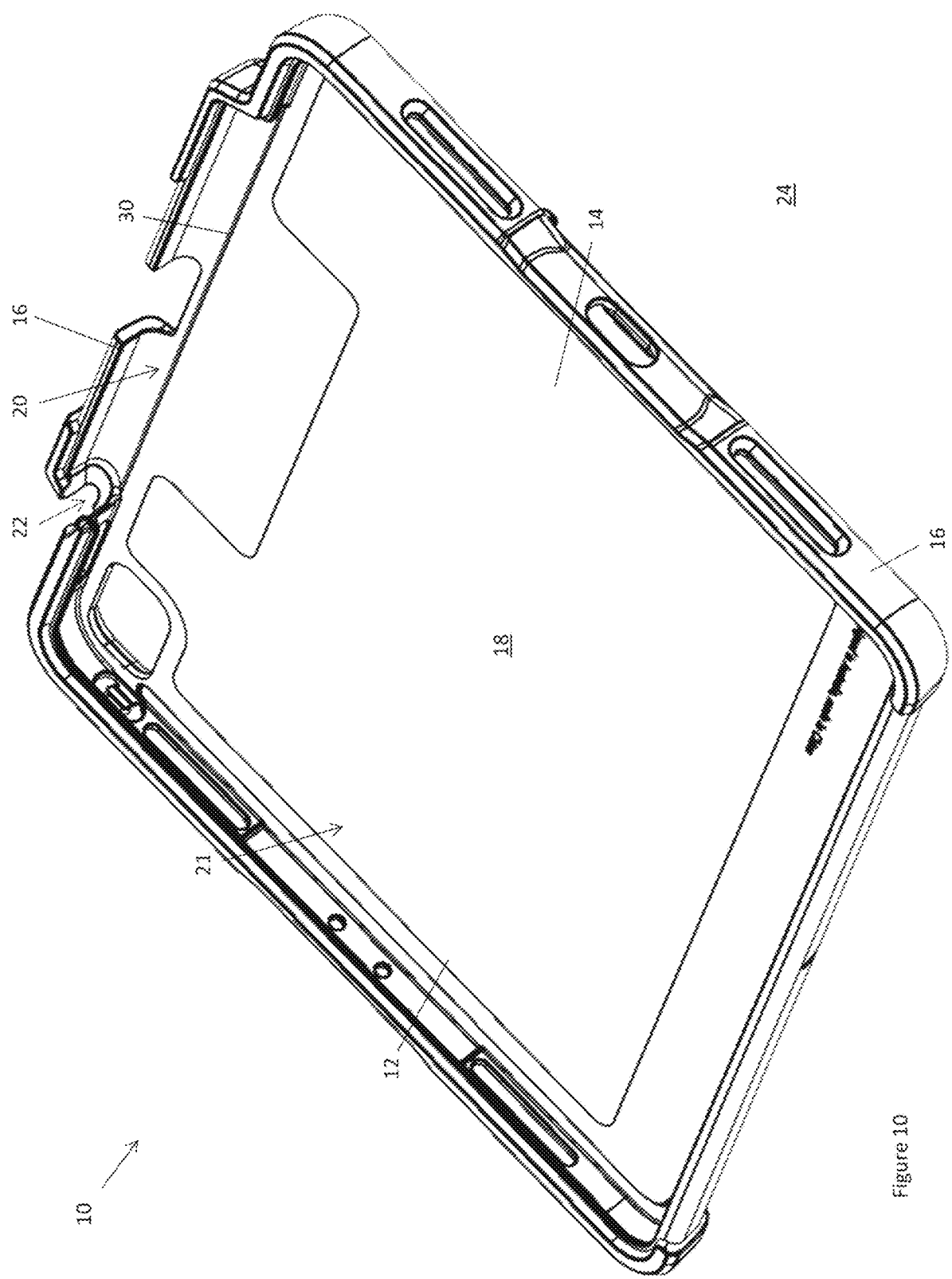
FIG. 10 shows another perspective view of the case of FIG. 1, with the protective flap hidden for illustrative purposes, and with the tablet shaped device and stylus removed.

The stylus receiving space 20 is elongated and intermediate an outer edge of the tablet shaped device receiving space 21—which is indicated by line 30 in FIG. 10—and the perimeter wall 16. A portion of the perimeter wall 16 on the outer side of the stylus receiving space 20 outwardly bulges to provide the stylus receiving space 20. The perimeter wall 16 defines a passageway 22 between the stylus receiving space 20 and a case exterior 24. The passageway 22 is configured to receive an end 26 of the stylus 2, in this embodiment the tip-end, when the stylus 2 is so received by the stylus receiving space 20. The passageway may be no wider than the stylus width. In another embodiment, the passageway 22 is configured to receive a blunt end—opposite the tip end—of the stylus 2. The passageway 22 comprises a slot, however in an alternative embodiment it may comprise a through hole. Generally, the passageway passes through the perimeter wall 16, however it may be blind passage (e.g. a blind hole).

In the present but not all embodiments, a tablet shaped device control button 28 is adjacent the passageway. The control button 28 when depressed actuates a control button on an edge surface of tablet shaped device, for example a volume control button, a power button or generally any type of button. The passageway 22 enables the use of an elongated stylus receiving space 20 that is shorter than the length of the stylus 2. A portion of the perimeter wall defining the stylus receiving space ends adjacent the button. Without the passageway 22, an outwardly projecting end 33 of the perimeter wall 16 may extend over the control button 28 of the tablet shaped device, preventing operation thereof.

The perimeter wall 16 comprises at least one distal inwardly projecting resilient lip for 32 for holding the tablet shaped device 1 within the tablet shaped device receiving space 21. A portion 40 of the perimeter wall 16 that extends along an outer-side of the stylus receiving space 20 does not comprise a stylus retaining feature (examples of which include but are not limited to ribs and semi-spheres) projecting into the stylus receiving space. In the illustrated embodiments, the perimeter wall does not comprise a stylus retaining feature projecting into the stylus receiving space 20.

The frontward facing opening of the tabled shaped device receiving space 21 is constricted by the resilient lip 32. The tablet shaped device 1 may be inserted by squeezing it through the opening defined by the resilient lip 32. The at least one resilient lip 32 deforms to accommodate the passage of the tablet shaped device 1, and recoils back into shape subsequent to passage of the tablet shaped device 1.

In another embodiment the tablet shaped 1 device may be held to the case 10 by at least one elastic strap or generally by any suitable means.

Figure 6:
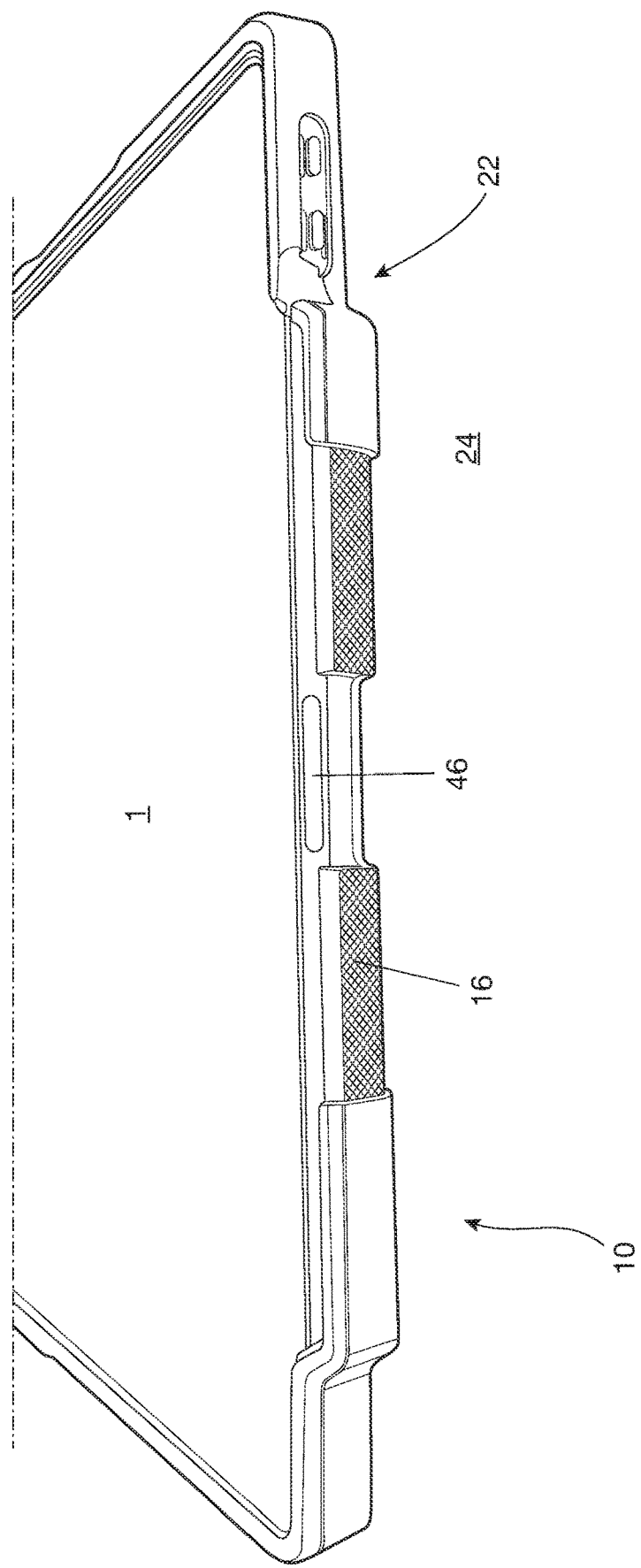
FIG. 6 is a photograph of a detail of the case of FIG. 1, with the pencil removed, to reveal a magnetic connector of the tablet shaped device.
Figure 7:
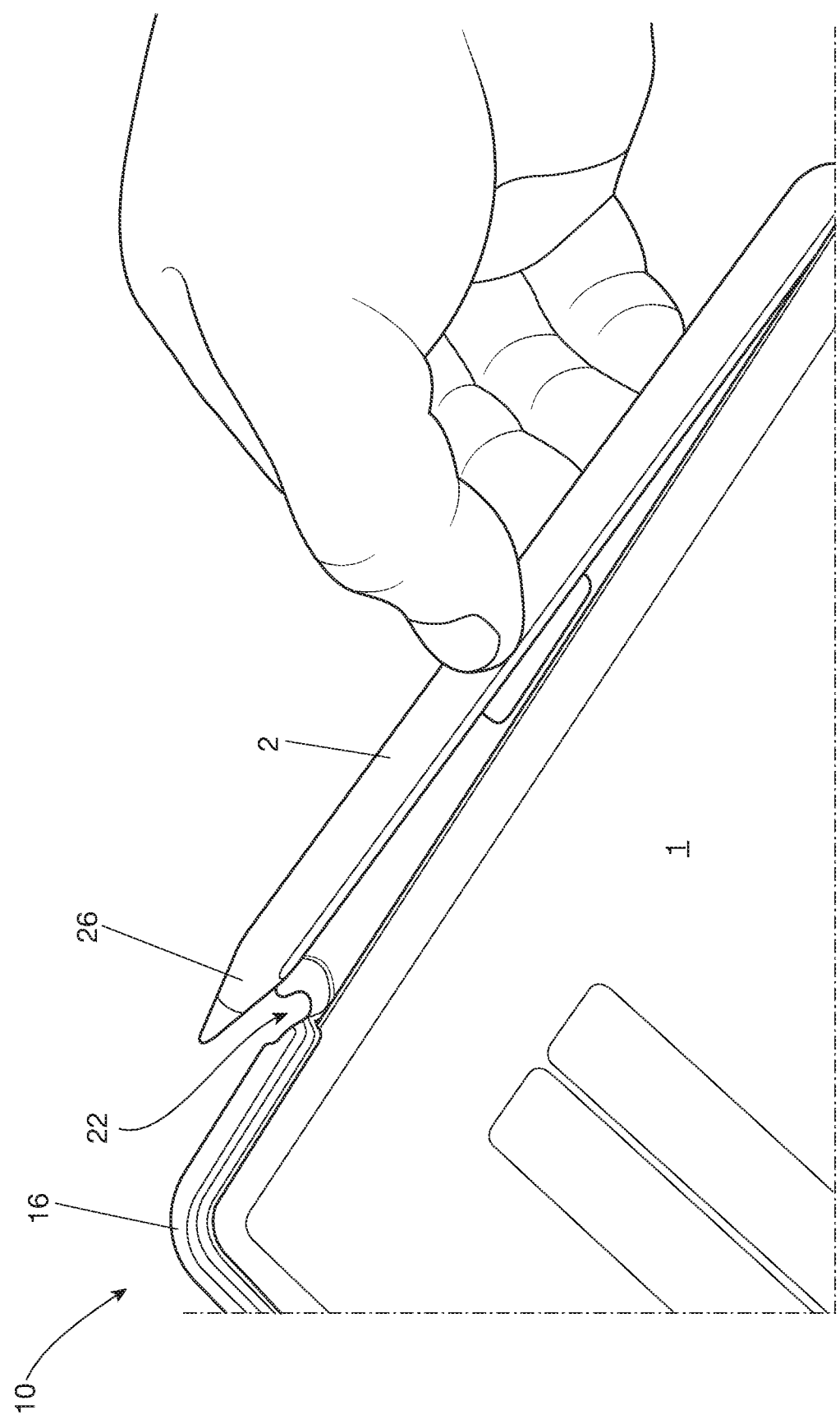
FIG. 7 is a photograph of a hand of a user removing the stylus from the tablet shaped device.
Figure 8:
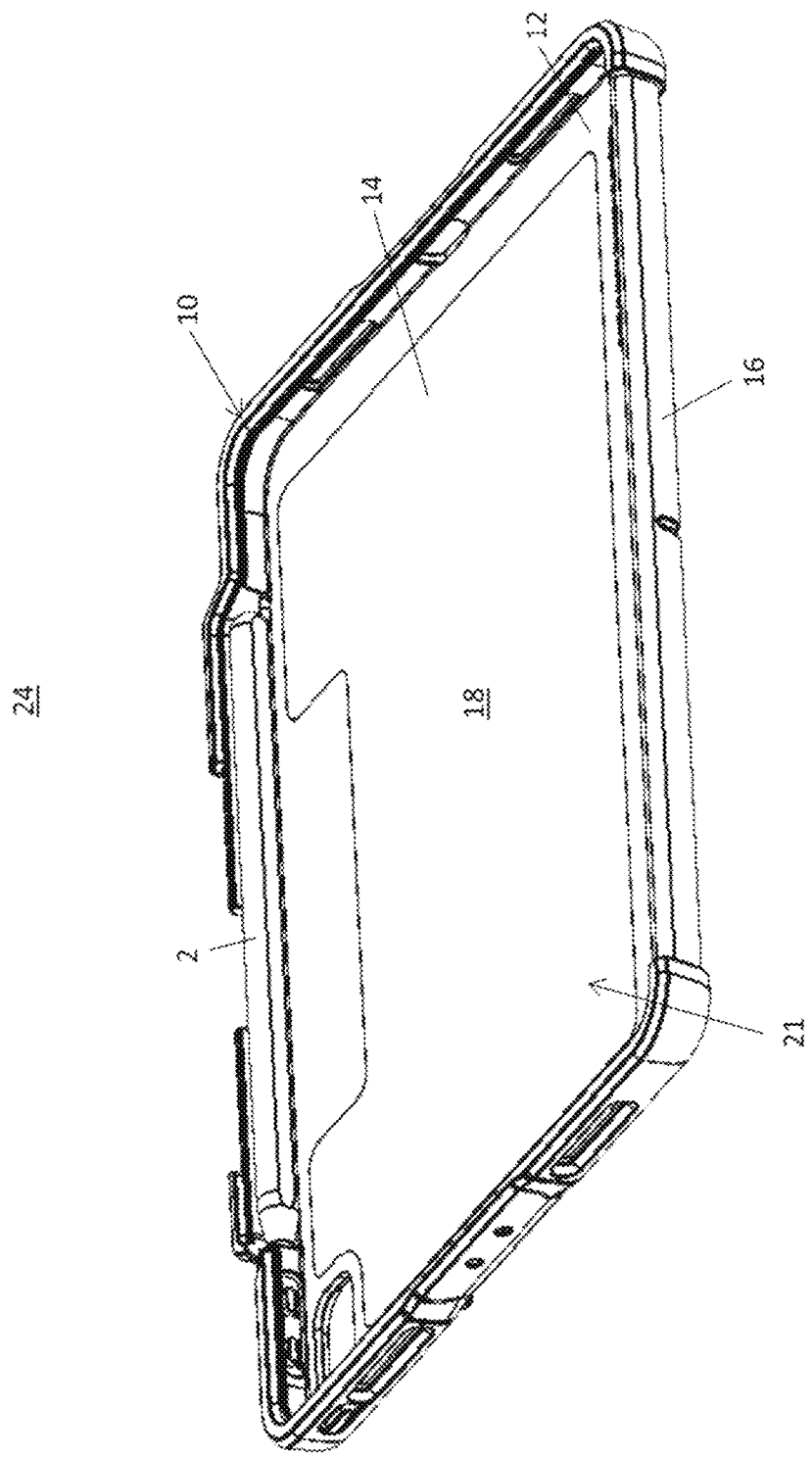
FIGS. 8 and 9 show different perspective views of the case of FIG. 1, with the protective flap hidden for illustrative purposes, and with the tablet shaped device removed.
Figure 9:
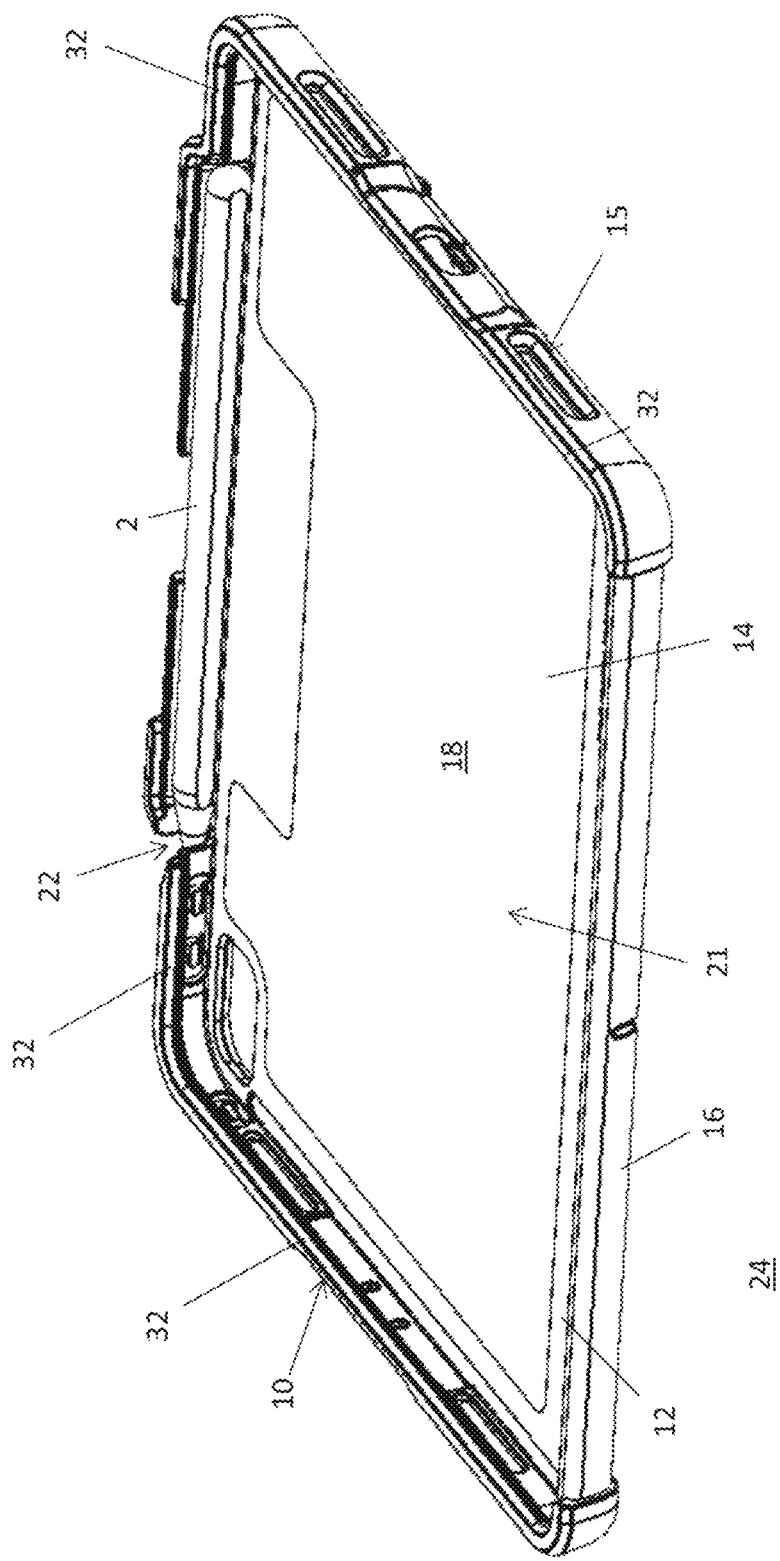
Figure 11:
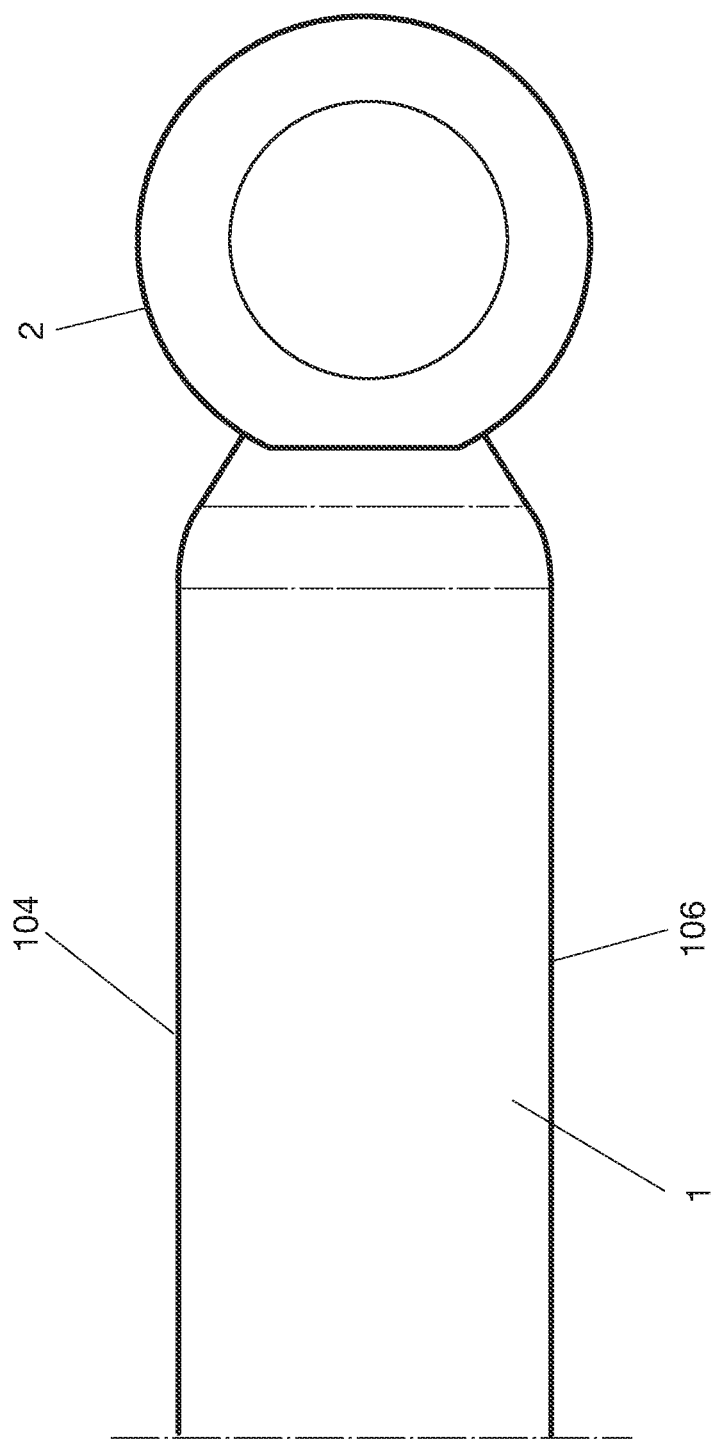
FIG. 11 shows a side elevational view of a portion of the tablet shaped device having the stylus magnetically attached to a side surface thereof.

FIG. 11 shows a side elevational view of a portion of a tablet shaped device 1 having the stylus 2 magnetically attached to an exterior edge surface thereof. FIG. 6 is a photograph of a detail of the case 10 of FIG. 1, with the pencil 2 removed, to reveal a magnetic connector 46 of the tablet shaped device. The thickness 100 of the tablet shaped device 1 is less than the thickness 102 of the stylus 2. The magnetically attached stylus 2 extends beyond the top surface 104 and the bottom surface 106 of the tablet shaped device 1, however in other embodiments it may extend beyond only one of the top surface and bottom surface, or neither of the top surface and the bottom surface. The stylus receiving space 20 is deeper than the tablet shaped device receiving space 21, however in another embodiment it is not so. In the illustrated embodiments, the stylus receiving space 20 is deeper than the tablet shaped device receiving space 21 by at least half the difference between the thickness 100 of the tablet shaped device 1 and a transverse stylus dimension 102, for example the greatest thickness of the stylus 2. The depth difference is generally, but not necessarily, no more than a transverse dimension of the stylus 2, for example the greatest thickness of the stylus. Some examples of a stylus and a tablet shaped device receivable by the case 10 may not be magnetically attachable to each other.

The perimeter wall 16 provides finger access to the stylus 2 when so received through a finger port 42.

The inside surface of the rear wall 14 has an optional inner lining in the form of a inner felt lining. The inner lining provides a relatively soft surface to reduce scratching of the tablet shaped device. Other embodiments may not have an inner lining or may have another suitable lining material.

The case 10 has an optional flap 44. A proximal end of the flap 44 is fixed to a rear of the body 12. In this embodiment, the proximal end is fixed to the rear of the body 12 with an adhesive, however any suitable form of attachment may be used, for example thermal bonding, fasteners in the form of rivets, screws, clips, or other suitable fastener.

Figure 4:
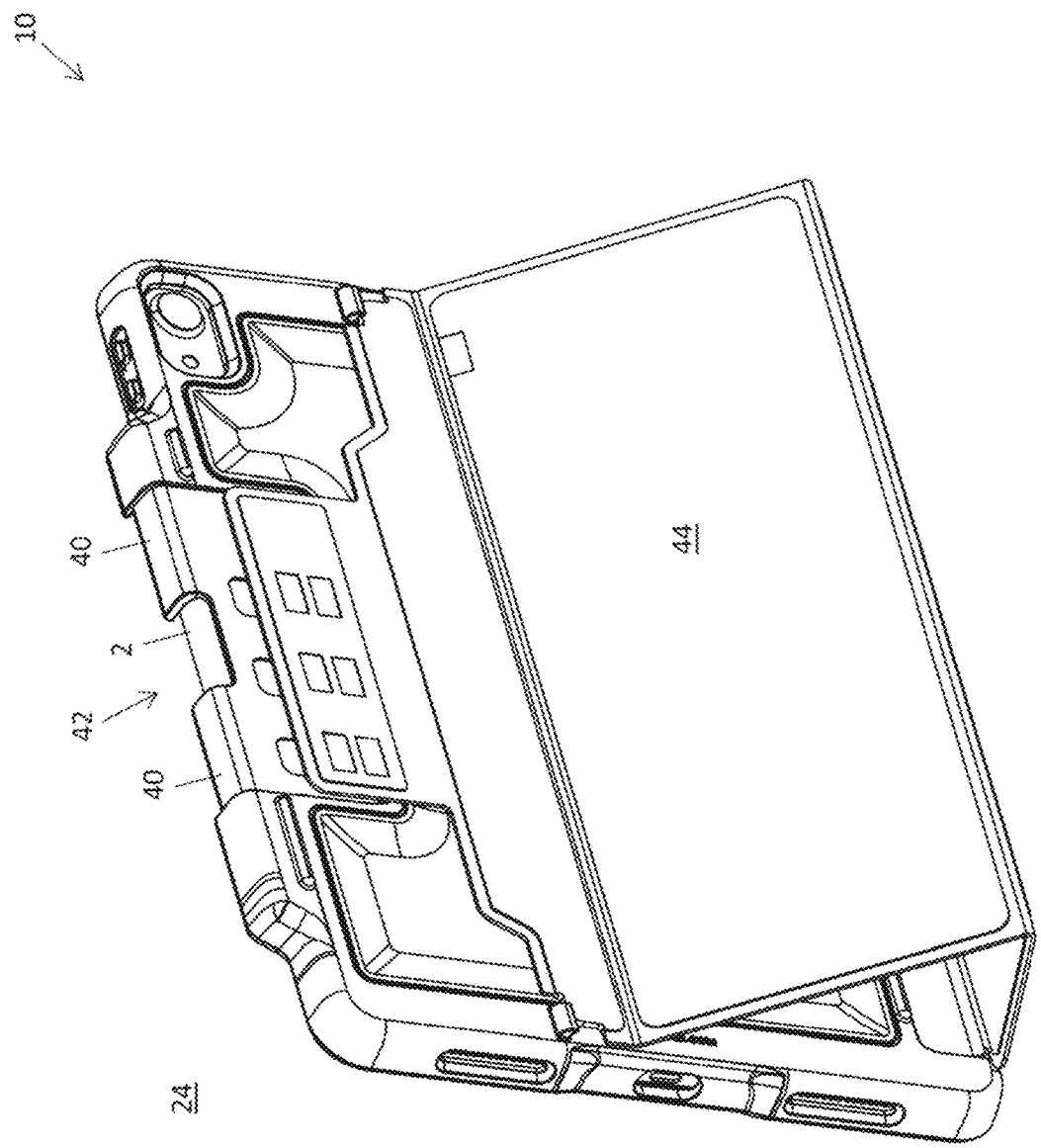
FIG. 4 shows a perspective view of the rear of the case of FIG. 1, with the protective flap in the stand configuration, in which the flap is folded at the rear of the case.
Figure 5:
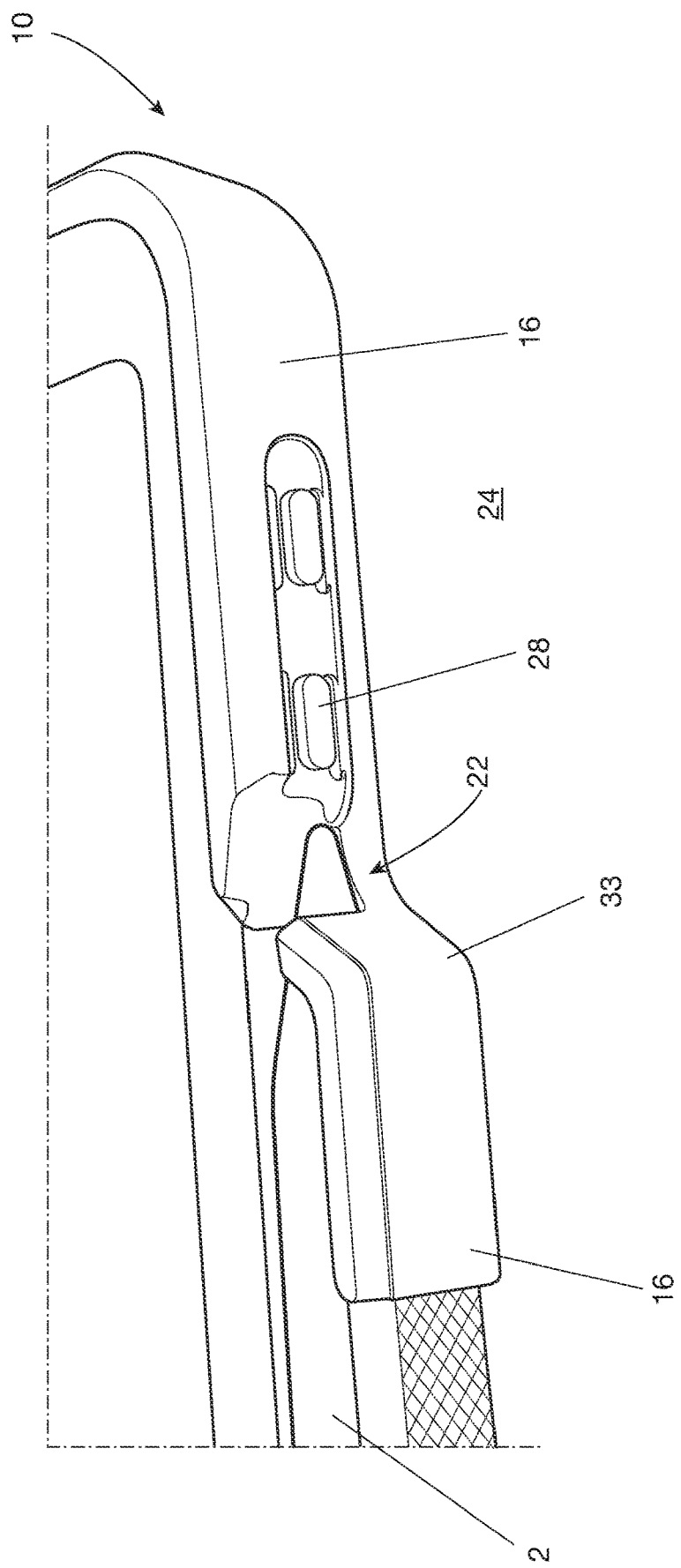
FIG. 5 is a photograph of a detail of the case for the tablet shaped device of FIG. 1, wherein the body of the stylus is interior of the case and a tip of the stylus is exterior of the case.

A flap 44 is configurable between a 1st configuration and a 2nd configuration. In the 1st configuration the flap 44 covers the tablet shaped device receiving space 21 and the stylus receiving space 20. In the 2nd configuration, the flap 44 is folded to form a stand as shown in FIG. 4.

The flap 44 also has a third configuration, in which the case is flat and open.

Figure 12:
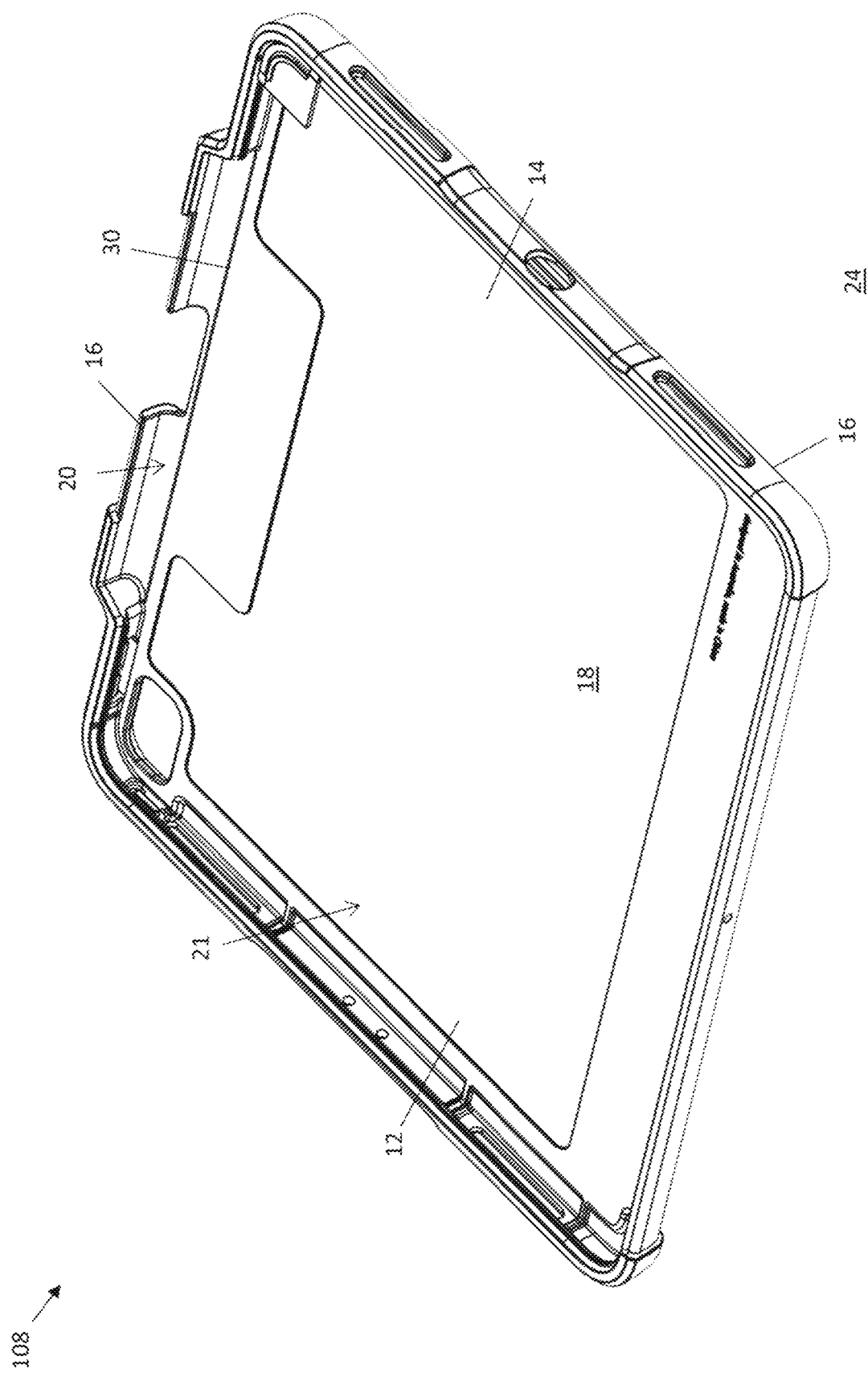
FIG. 12 shows a perspective view of another embodiment of a case for a tablet shaped device.

FIG. 12 shows a perspective view of another embodiment of a case 108 for a tablet shaped device, where parts having the same or similar form and/or function to those in FIGS. 1-10 are similarly numbered. The case 108 comprises a body 12 comprising a rear wall 14, a perimeter wall 16 and a front face 18. The rear wall 14 and the perimeter wall 16 are cooperatively arranged to provide a stylus receiving space 20 at the front face 18 for receiving a stylus 2 for the tablet shaped device. The rear wall 14 and the perimeter wall 16 are cooperatively arranged to provide a tablet shaped device receiving space 21 at the front face 18 for receiving the tablet shaped device. The tablet shaped device receiving space 21 is contiguous with the stylus receiving space 20.

The case 108 is configured to receive a larger tablet shaped device than tablet shaped device 1. The tablet shaped device receiving space 21 is larger than corresponding tablet shaped device receiving space 21 of the embodiment of FIGS. 1-10. The case 108, however, is configured to receive the same stylus 2. Case 108 does not have a passageway 22 configured to receive an end of the stylus (e.g. the tip-end), as in this embodiment it may not be needed.

The case 10 may be made using generally any suitable method. An embodiment of making a case for a tablet shaped device comprises a step of forming a body comprising at least a first material. The method also comprises an optional step of forming a flap comprising at least a second material. In another optional step of the method, the flap and the body are fastened together using an adhesive, however any suitable form of attachment may be used, for example thermal bonding, fasteners in the form of rivets, screws, clips or other suitable fasteners.

The step of forming the body may comprise forming the body by an injection moulding process. At least one polymer—for example a polyurethane, polycarbonate or generally any suitable polymer—may be injected into a mould configured for production of the body. The illustrated embodiment has a body 12 formed by injection moulding. The body 12 has a polycarbonate exterior and a polyurethane interior. The polyurethane is relatively soft for receiving the tablet shaped device 1. The relatively resilient polyurethane facilitates insertion and removal of the device and provides a degree of shock resistance against knocks and falls. The polycarbonate exterior forms a hard protective shell.

The step of forming the flap comprises the step of forming a laminate of polymer board—an example of which includes but is not limited to polyethylene board—sandwiched between rigid polymer sheets in the form of polyethalane sheets, however any suitable polymer board and polymer sheet may be used. The board and the sheets may be heat bonded and may subsequently be trimmed.

Variations and/or modifications may be made to the embodiments described without departing from the spirit or ambit of the invention. For examples, some embodiments do not comprise a protective flap. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A case for a tablet shaped device, the case comprising:
    a body comprising a rear wall, a perimeter wall and a front face, the rear wall and the perimeter wall being cooperatively arranged to provide a stylus receiving space at the front face for receiving a stylus for the tablet shaped device and a tablet shaped device receiving space at the front face for receiving the tablet shaped device, the tablet shaped device receiving space being contiguous with the stylus receiving space, wherein there is no barrier between the tablet shaped device receiving space and the stylus receiving space.

2. A case for a tablet shaped device defined by claim 1, wherein the perimeter wall defines a passageway between the stylus receiving space and a case exterior, the passageway being configured to receive an end of the stylus when the stylus is so received by the stylus receiving space.

3. A case for a tablet shaped device defined by claim 2, wherein the passageway comprises a slot.

4. A case for a table shaped device defined by claim 1, wherein the perimeter wall does not comprise a stylus retaining feature projecting into the stylus receiving space.

5. A case for a tablet shaped device defined by claim 1, wherein the stylus receiving space is deeper than the tablet shaped device receiving space.

6. A method for protecting a tablet shaped device, the method comprising:
    inserting the tablet shaped device into a tablet shaped device receiving space of a case for the tablet shaped device, the case comprising:
        a body comprising a rear wall, a perimeter wall and a front face, the rear wall and the perimeter wall being cooperatively arranged to provide a stylus receiving space at the front face for receiving a stylus for the tablet shaped device and the tablet shaped device receiving space at the front face for receiving the tablet shaped device, the tablet shaped device receiving space being contiguous with the stylus receiving space;
    inserting a stylus into the stylus receiving space of the case for the tablet shaped device;
    wherein the stylus becomes magnetically attached to the tablet shaped device disposed within the tablet shaped device receiving space.

\* \* \* \* \*